(12) United States Patent
Prevost et al.

(10) Patent No.: US 10,246,195 B2
(45) Date of Patent: Apr. 2, 2019

(54) ARCHED INFLATABLE STRUCTURE FOR EVACUATION SLIDE SYSTEMS

(71) Applicant: Goodrich Corporation, Charlotte, NC (US)

(72) Inventors: Craig Prevost, Phoenix, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 233 days.

(21) Appl. No.: 15/266,816

(22) Filed: Sep. 15, 2016

(65) Prior Publication Data

US 2018/0072427 A1 Mar. 15, 2018

(51) Int. Cl.
*B64D 25/14* (2006.01)
*A62B 1/20* (2006.01)

(52) U.S. Cl.
CPC .............. *B64D 25/14* (2013.01); *A62B 1/20* (2013.01)

(58) Field of Classification Search
CPC .................................. B64D 25/14; A62B 1/20
See application file for complete search history.

(56) References Cited

U.S. PATENT DOCUMENTS

| 3,370,684 | A | * | 2/1968 | Holcombe | A62B 1/20 193/25 B |
| 3,470,991 | A | * | 10/1969 | Holcombe | A62B 1/20 193/25 B |
| 3,860,984 | A | * | 1/1975 | Fisher | A62B 1/20 182/48 |
| 4,018,321 | A | * | 4/1977 | Fisher | A62B 1/20 182/48 |
| 4,434,870 | A | * | 3/1984 | Fisher | A62B 1/20 182/48 |
| 4,723,628 | A | * | 2/1988 | Fisher | A62B 1/20 182/48 |
| 5,975,467 | A | * | 11/1999 | O'Donnell | B64D 25/14 182/48 |
| 6,454,220 | B1 | | 9/2002 | Oney | |
| 6,536,715 | B1 | * | 3/2003 | Moran | B64D 25/14 182/48 |

(Continued)

FOREIGN PATENT DOCUMENTS

| EP | 1375346 | 1/2004 |
| EP | 1431178 | 6/2004 |
| EP | 1538079 | 6/2005 |

OTHER PUBLICATIONS

European Patent Office, European Search Report dated Jan. 25, 2018 in Application No. 17191020.1-1010.

*Primary Examiner* — Timothy D Collins
*Assistant Examiner* — Tye William Abell
(74) *Attorney, Agent, or Firm* — Snell & Wilmer L.L.P.

(57) ABSTRACT

An evacuation slide may comprise an arched tube configured to extend between a first side tube and a second side tube of the evacuation slide and a strap configured to be coupled between the arched tube and a center tube of the evacuation slide. The arched tube may be configured to provide vertical support to the first side tube and to the second side tube in response to a tension in the strap. The evacuation slide may comprise a dual lane slide, the first side tube and the center tube defining a first lane and the second side tube and the center tube defining a second lane.

18 Claims, 8 Drawing Sheets

(56) References Cited

U.S. PATENT DOCUMENTS

| | | | |
|---|---|---|---|
| 2003/0070871 A1* | 4/2003 | Idler | A62B 1/20 182/48 |
| 2014/0009274 A1* | 1/2014 | Kohlmeier-Beckmann | B64D 25/14 340/425.5 |
| 2015/0151817 A1 | 6/2015 | Rasmussen | |

* cited by examiner

ARCHED INFLATABLE STRUCTURE FOR EVACUATION SLIDE SYSTEMS

FIELD

The present disclosure relates to inflatable evacuation slides and, in particular, to inflatable evacuation slides having supplemental structural support arrangements.

BACKGROUND

Emergency evacuation slides may be used to exit an aircraft absent a jet way or other suitable means of egress for passengers. The slides may deploy from a door sill or a side of the aircraft fuselage, for example. Various additional tubes and/or straps may be utilized to increase structural strength of the emergency evacuation slide.

SUMMARY

In various embodiments, an evacuation slide is disclosed. An evacuation slide may comprise an arched tube configured to extend between a first side tube and a second side tube of the evacuation slide, and a strap configured to be coupled between the arched tube and a center tube of the evacuation slide, wherein the arched tube is configured to provide vertical support to the first side tube and to the second side tube in response to a tension in the strap.

In various embodiments, the arched tube may extend in a direction substantially orthogonal to the center tube. The evacuation slide may comprise a sliding surface disposed between the first side tube and the second side tube. The center tube may extend substantially within a first plane and the strap extends in the first plane. The evacuation slide may comprise a dual lane slide, the first side tube and the center tube defining a first lane and the second side tube and the center tube defining a second lane. The strap may be attached to the arched tube and may be attached to the center tube at a location between the arched tube and a toe end of the evacuation slide. The strap may be attached to the arched tube and may be attached to the center tube at a location between the arched tube and a head end of the evacuation slide. The arched tube may be configured to contact the center tube in response to the evacuation slide being deployed.

In various embodiments, an evacuation system for an aircraft structure is disclosed. An evacuation system for an aircraft structure may comprise an evacuation slide coupled to the aircraft structure. The evacuation slide may comprise a first side tube, a center tube, the first side tube and the center tube defining a first lane, a second side tube, the second side tube and the center tube defining a second lane, an arched tube extending between the first side tube and the second side tube, and a strap coupled between the arched tube and the center tube, wherein the arched tube is configured to provide vertical support to the first side tube and to the second side tube in response to a tension in the strap.

In various embodiments, the arched tube may extend in a direction substantially orthogonal to the center tube. The evacuation slide may comprise a sliding surface disposed between the first side tube and the second side tube. The first side tube, the second side tube, and the center tube may be disposed substantially in parallel. The center tube may extend substantially within a first plane and the strap extends in the first plane. The strap may be attached to the arched tube and may be attached to the center tube at a location between the arched tube and a toe end of the evacuation slide. The strap may be attached to the arched tube and may be attached to the center tube at a location between the arched tube and a head end of the evacuation slide. The arched tube may be configured to contact the center tube in response to the evacuation slide being deployed. The strap may be oriented at an angle relative to the center tube.

In various embodiments, a method for supporting a slide from bending under load is disclosed. A method for supporting a slide from bending under load may comprise supporting a central portion of a first side tube and a central portion of a second side tube with an arched tube connected therebetween and with a strap connected longitudinally between a first location along a center tube and the arched tube and between a second location along the center tube and the arched tube, the center tube extending longitudinally between the first side tube and the second side tube.

In various embodiments, the method may further comprise compressing the arched tube in response to a bending load applied to at least one of the first side tube and the second side tube. The method may further comprise tensioning the strap in response to the compression in the arched tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface. An arched dropdown tube is provided to distribute the weight or load of an evacuee exiting the aircraft structure via the slide. The slide may comprise a dual lane slide comprising two side tubes and a center tube extending parallel to the lanes. The arched dropdown tube may be coupled between the two side tubes and may contact the center tube when the dual lane slide is inflated. Straps may couple the arched dropdown tube to the center tube. In this regard, the arched dropdown tube arrangement may form a truss structure with the slide for load distribution. In this regard, the arched dropdown tube and strap may increase structural integrity (i.e., beam strength or stiffness of the slide) while minimizing weight and pack volume of the slide.

Figure 1A:
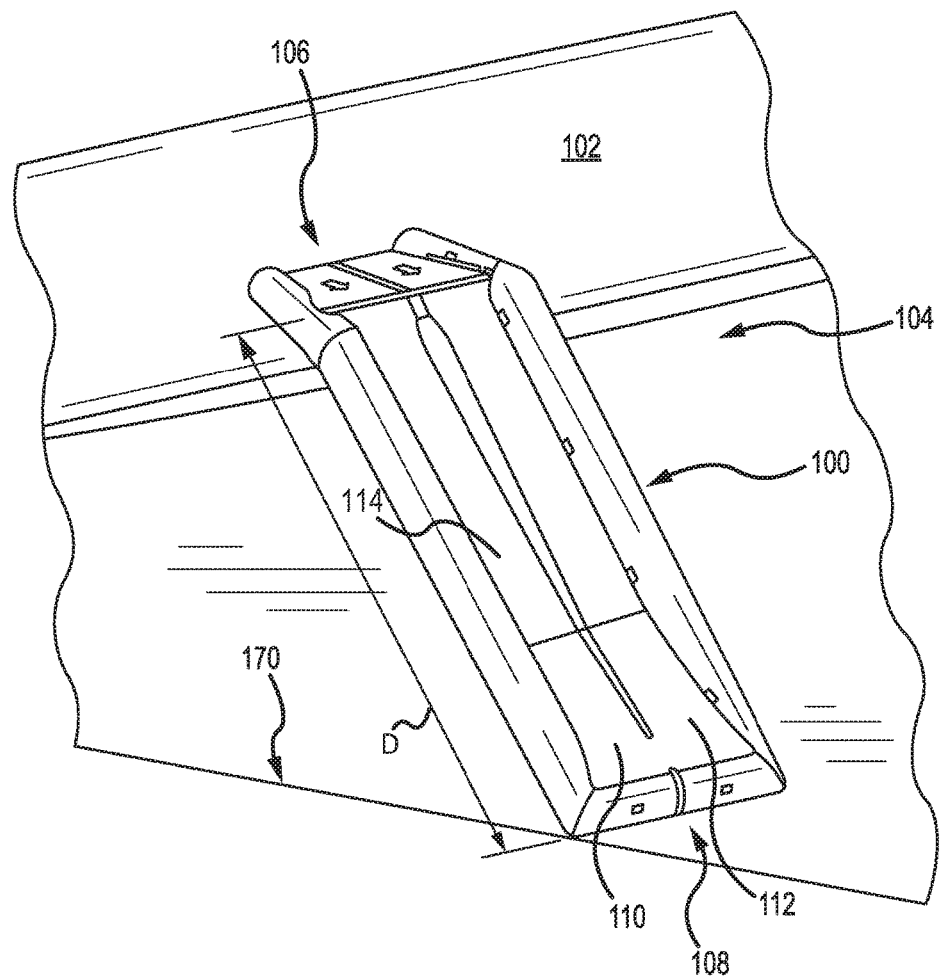
FIG. 1A illustrates a perspective view of an evacuation slide in a deployed position, in accordance with various embodiments.
Figure 1B:
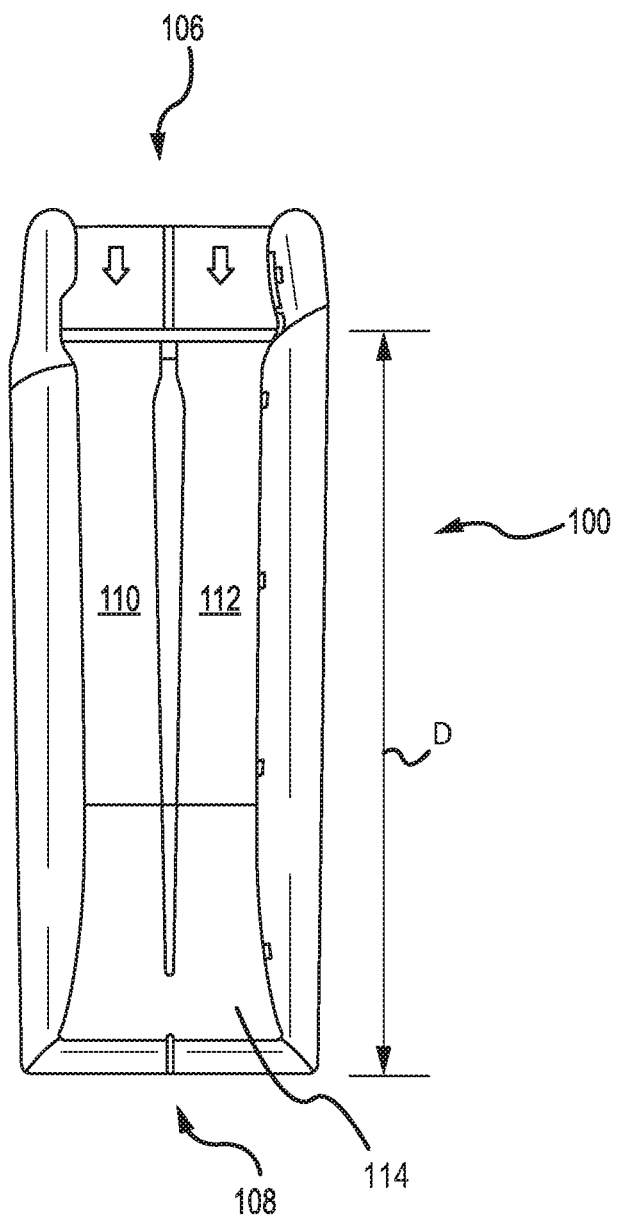
FIG. 1B illustrates a top view of an inflated evacuation slide, in accordance with various embodiments.
Figure 2:
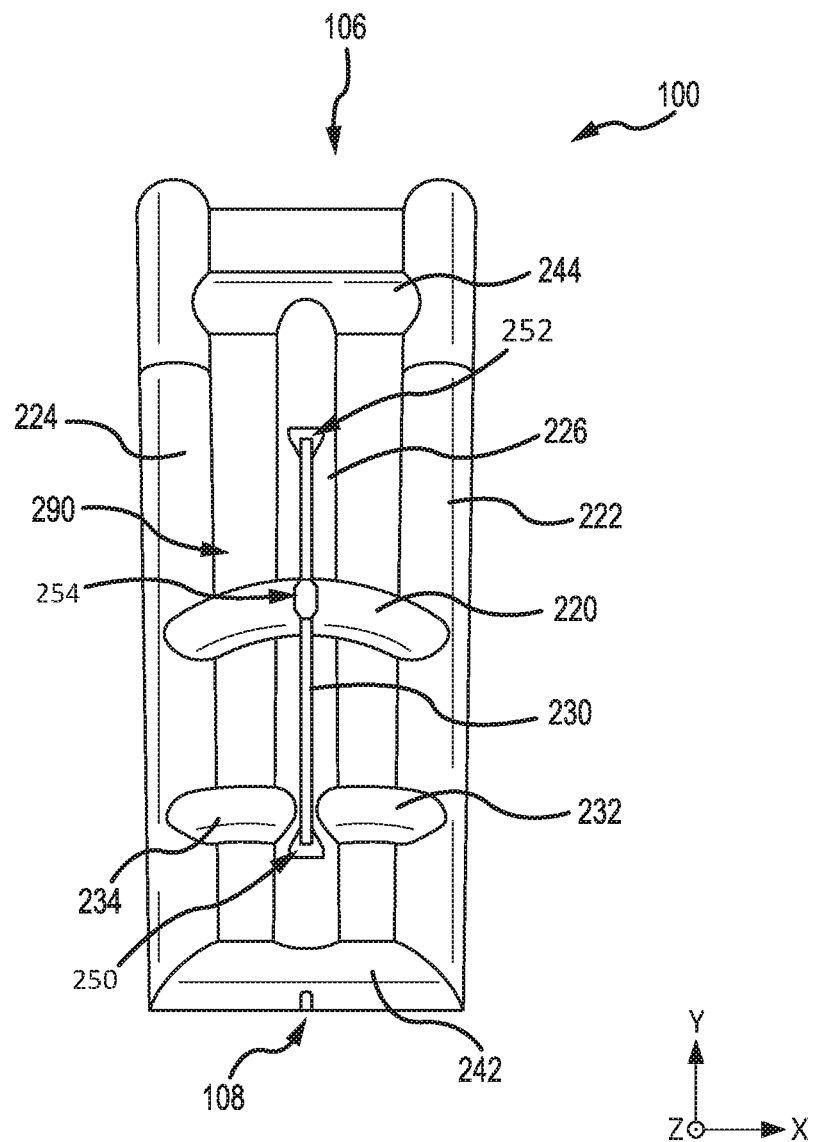
FIG. 2 illustrates a bottom view of an inflated evacuation slide, in accordance with various embodiments.
Figure 3:
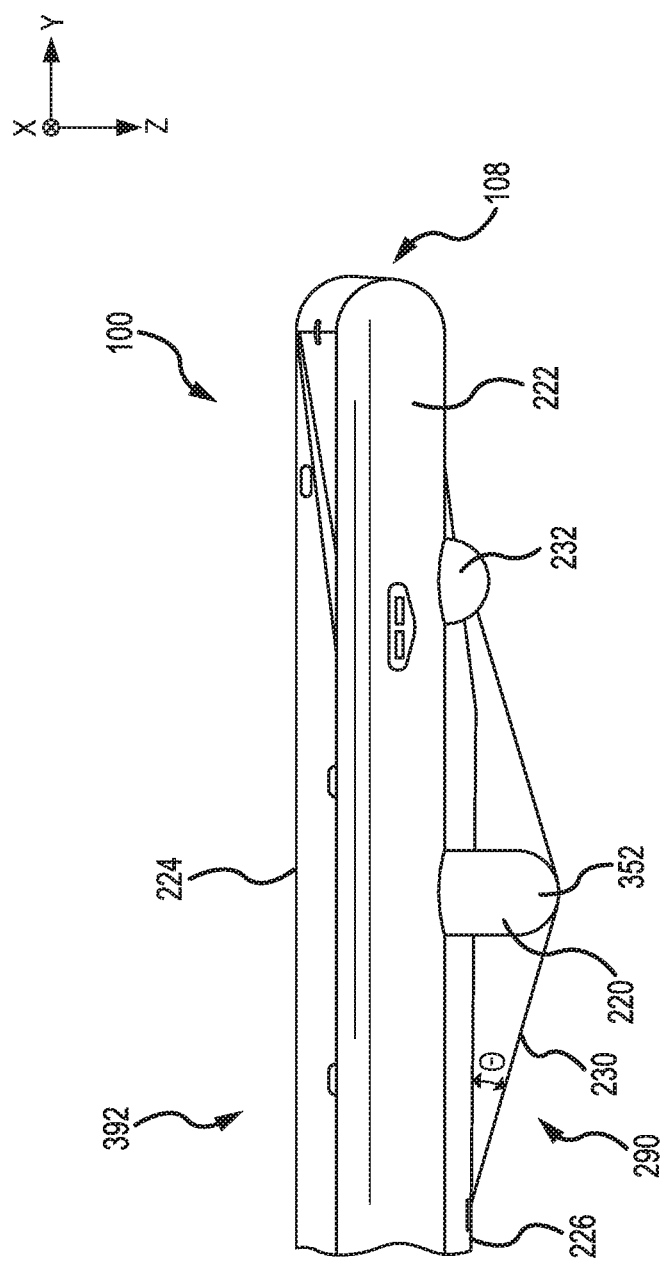
FIG. 3 illustrates a side view of an inflated evacuation slide, in accordance with various embodiments.
Figure 4:
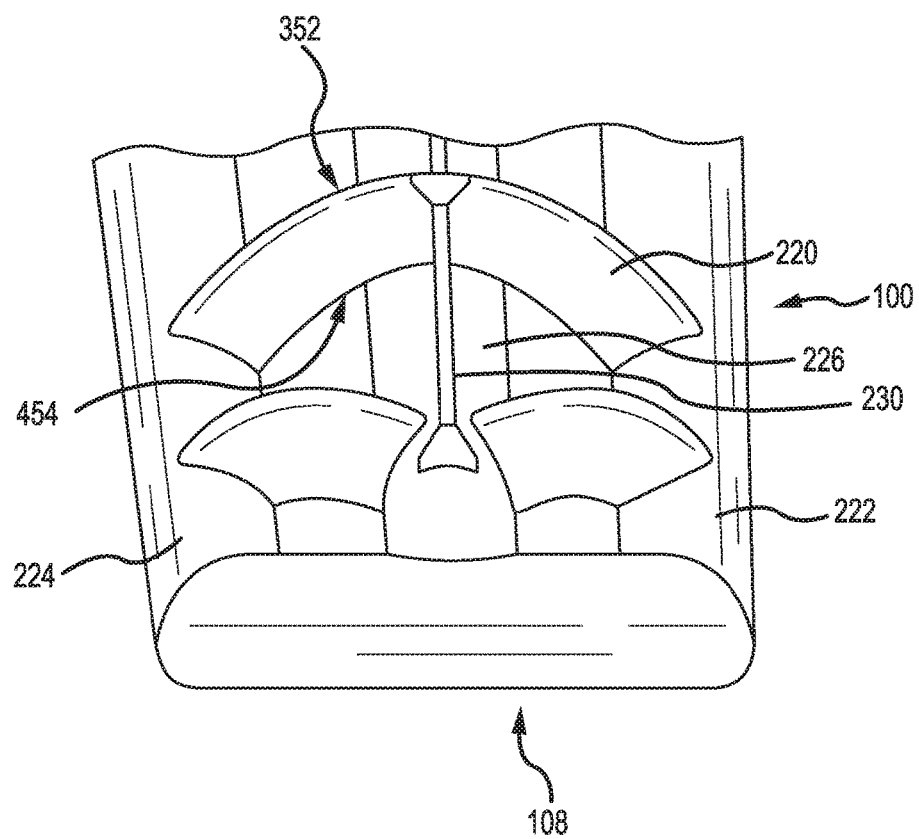
FIG. 4 illustrates a perspective view of the bottom side of an inflated evacuation slide near the toe end, in accordance with various embodiments.

With respect to FIG. 2, elements with like element numbering, as depicted in FIG. 1A and FIG. 1B, are intended to be the same and will not necessarily be repeated for the sake of clarity. With respect to FIG. 3 through FIG. 6, elements with like element numbering, as depicted in FIG. 1A through FIG. 2, are intended to be the same and will not necessarily be repeated for the sake of clarity. With respect to FIG. 4, elements with like element numbering, as depicted in FIG. 3, are intended to be the same and will not necessarily be repeated for the sake of clarity.

With combined reference to FIG. 1A and FIG. 1B, an evacuation system 104 is illustrated, in accordance with various embodiments. Evacuation system 104 may comprise evacuation slide 100 coupled to an aircraft structure 102. Evacuation slide 100 may comprise a head end 106 and a toe end 108. Head end 106 may be coupled to aircraft structure 102. In various embodiments, aircraft structure 102 may comprise a fuselage, a fairing, a wing, or any other portion of an aircraft. FIG. 1A and FIG. 1B illustrate evacuation slide 100 in a deployed position. Evacuation slide 100 may comprise an inflatable slide. FIG. 1A and FIG. 1B illustrate evacuation slide 100 in an inflated position. Evacuation slide 100 may comprise a dual lane slide comprising a first lane 110 and a second lane 112. Toe end 108 may contact an exit surface 170 in response to evacuation slide 100 being deployed. In various embodiments, evacuation slide 100 may be inflated in response to opening an emergency exit door. Evacuation slide 100 may comprise a sliding surface 114. Sliding surface 114 may comprise a dimension D. Dimension D may comprise the length of sliding surface 114. Dimension D may comprise the length of the sloped portion of evacuation slide 100, in response to evacuation slide 100 being in the deployed or inflated position, as illustrated in FIG. 1A.

With reference to FIG. 2, a bottom view of evacuation slide 100 is shown having an arched tube 220. An xyz-axes is provided for ease of illustration. As used herein, the bottom side 290 of evacuation slide 100 may be the underside of evacuation slide 100, or the side of evacuation slide 100 opposite the sliding surface 114 (see FIG. 1). Arched tube 220 may be coupled between side tube (also referred to herein as first side tube) 222 and side tube (also referred to herein as second side tube) 224. Arched tube 220 may be located at the bottom side 290 of evacuation slide 100. Center tube 226 may be located between side tube 222 and side tube 224. Side tube 222, side tube 224, and center tube 226 may be disposed in parallel. Stated another way, side tube 222, side tube 224, and center tube 226 may each extend in a similar direction (i.e., in the y-direction) (also referred to herein as a first direction). Side tube 222, side tube 224, and center tube 226 may each extend in the xy-plane (also referred to herein as a first plane). Side tube 222, side tube 224, and center tube 226 may be coupled together at toe end 108 via cross tube 242. Cross tube 242 may be in contact with the exit surface (i.e., exit surface 170 of FIG. 1A) in response to evacuation slide 100 being deployed. Side tube 222, side tube 224, and center tube 226 may be coupled together at head end 106 via cross tube 244.

In various embodiments, with combined reference to FIG. 1A and FIG. 2, arched tube 220 may be located between cross tube 242 and cross tube 244. Arched tube 220 may be located substantially half-way between cross tube 242 and cross tube 244. In various embodiments, arched tube 220 may be located between twenty percent (20%) and eighty percent (80%) of dimension D from toe end 108, and in various embodiments, between thirty percent (30%) and seventy percent (70%) of dimension D from toe end 108, and in various embodiments, between forty percent (40%) and sixty percent (60%) of dimension D from toe end 108, and in various embodiments, between forty-five percent (45%) and fifty-five percent (55%) of dimension D from toe end 108.

In various embodiments, side tube 222 and center tube 226 may at least partially define first lane 110 (see FIG. 1). Side tube 224 and center tube 226 may at least partially define second lane 112 (see FIG. 1). In various embodiments, arched tube 220 may extend substantially orthogonal (i.e., in the x-direction) to side tube 222, side tube 224, and/or center tube 226. In various embodiments, arched tube 220 may extend in the xz-plane (also referred to herein as a second plane) as illustrated in FIG. 2.

In various embodiments, with reference to FIG. 2, strap 230 may be coupled to center tube 226 at location 250 and location 252. In various embodiments, strap 230 may be attached to center tube 226 via an adhesive or glue. Strap 230 may be coupled to arched tube 220 at location 254. In various embodiments, strap 230 may be attached to arched tube 220 via an adhesive or glue. In various embodiments, strap 230 may comprise a single unitary strap. In various embodiments, strap 230 may comprise two separate straps. For example a first strap may be coupled between location 254 and location 250 and a second strap may be coupled between location 254 and location 252. When viewing evacuation slide 100 from the bottom, strap 230 extends in a direction (i.e., the y-direction) parallel with center tube 226, as illustrated in FIG. 2. Although strap 230 may extend in a direction having a component orthogonal to the xy-plane, strap 230 may extend in a direction having a component in the y-direction. Stated another way, with additional reference to FIG. 3, strap 230 may comprise an angle theta (Θ) relative to center tube 226, when viewed from the side, as illustrated in FIG. 3. In various embodiments, angle Θ may comprise between five degrees and eighty-five degrees (5°-85°), and in various embodiments, between ten degrees and fifty-five degrees (10°-55°), and in various embodiments, between ten degrees and forty degrees (10°-40°).

In various embodiments, strap 230 may comprise a rope, tape, ribbon, webbing, or any other suitable strap. In various embodiments, strap 230 may comprise a corded or woven strap. In various embodiments, strap 230 may comprise an elastomer. In various embodiments, strap 230 may comprise nylon, ballistic nylon, polypropylene, polyester, cotton, or any other suitable material.

In various embodiments, evacuation slide 100 may comprise ground support tube 232 and ground support tube 234. Ground support tube 232 may be coupled between side tube 222 and center tube 226. Ground support tube 234 may be coupled between side tube 224 and center tube 226. Ground support tube 232 may comprise an arched tube. Ground support tube 234 may comprise an arched tube. Ground support tube 232 and ground support tube 234 may be located at the bottom side 290 of evacuation slide 100.

In various embodiments, ground support tubes 232, 234 may be configured to contact the ground in response to an evacuee sliding down evacuation slide 100 near toe end 108. Ground support tubes 232, 234 may prevent evacuation slide 100 from deflecting and/or buckling. Ground support tubes 232, 234 may provide a spring force on toe end 108 in response to the evacuee reaching the toe end 108 of evacuation slide 100 which may aid said evacuee exit evacuation slide 100.

With reference to FIG. 3, a side view of evacuation slide 100 is illustrated, in accordance with various embodiments. An xyz-axes is provided for ease of illustration. Center tube 226 may be disposed below side tubes 222, 224. Stated another way, center tube 226 may extend below side tubes 222, 224. Arched tube 220 may comprise a convex surface 352. With combined reference to FIG. 3 and FIG. 4, arched tube 220 may comprise a concave surface 454. In this regard, arched tube 220 may comprise a single, seamless arch between both ends of arched tube 220. Strap 230 may be in contact with convex surface 352 in response to evacuation slide 100 being deployed. Strap 230 may be fixed to convex surface 352. Center tube 226 may be in contact with arched tube 220 in response to evacuation slide 100 being deployed. Center tube 226 may be in contact with arched tube 220 at concave surface 454. Contact between center tube 226 and arched tube 220 may allow loads to be transferred between center tube 226 and arched tube 220.

Figure 5:
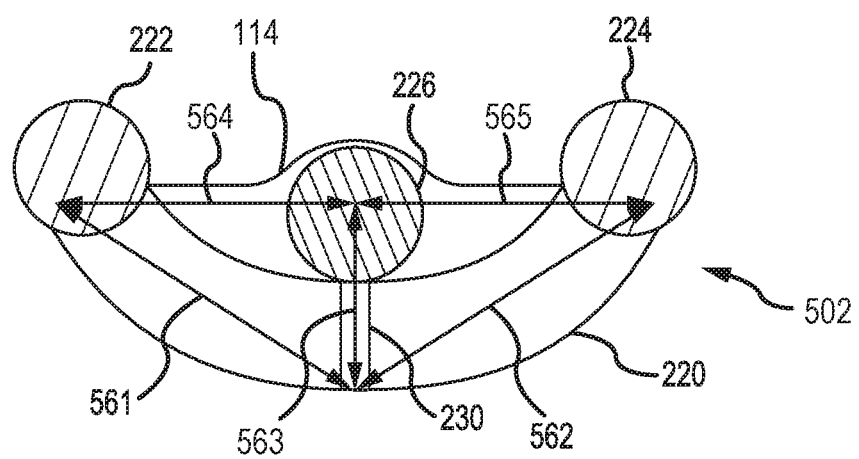
FIG. 5 illustrates a cross-section view of an inflated evacuation slide, in accordance with various embodiments.

With reference to FIG. 5, evacuation slide 100 may comprise a truss structure 502. In this regard, a first load path 561 may be formed between side tube 222 and arched tube 220. A second load path 562 may be formed between side tube 224 and arched tube 220. A third load path 563 may be formed between arched tube 220 and center tube 226. A fourth load path 564 may be formed between side tube 222 and center tube 226. A fifth load path 565 may be formed between side tube 224 and center tube 226.

In various embodiments, first load path 561 may be defined by side tube 222 and arched tube 220. Second load path 562 may be defined by side tube 224 and arched tube 220. Third load path 563 may be formed via strap 230. In this regard, third load path 563 may be defined by arched tube 220, strap 230, and center tube 226. Furthermore, third load path 563 may be defined by arched tube 220 and center tube 226, wherein the load is transferred via arched tube 220, in response to arched tube 220 contacting center tube 226 at concave surface 454 (see FIG. 4). With momentary additional reference to FIG. 2, fourth load path 564 may be defined by side tube 222, cross tube 242, and/or cross tube 244. Fifth load path 565 may be defined by side tube 224, cross tube 242, and/or cross tube 244. In this regard, the beam strength of evacuation slide 100 may be increased via truss structure 502. In various embodiments, arched tube 220 may provide vertical support to side tubes 222 and 224 being sufficient to meet the beam strength requirements of TSO-C69c of the Federal Aviation Administration. Further, in this regard, arched tube 220 may provide vertical support to side tube 222 and to side tube 224 in response to tension being applied to strap 230. In various embodiments, arched tube 220 may provide vertical support to center tube 226 in response to tension being applied to strap 230. Arched tube 220 may prevent side tube 222 and side tube 224 from bending or deflecting, in response to tension being applied to strap 230. Arched tube 220 may prevent center tube 226 from bending or deflecting, in response to tension being applied to strap 230. In various embodiments, arched tube 220 may provide vertical support to side tubes 222 and 224 being sufficient to negate the need for a strap or other supporting member on side tubes 222 and 224.

Sliding surface 114 may be disposed between first side tube 222 and second side tube 224.

Figure 6:
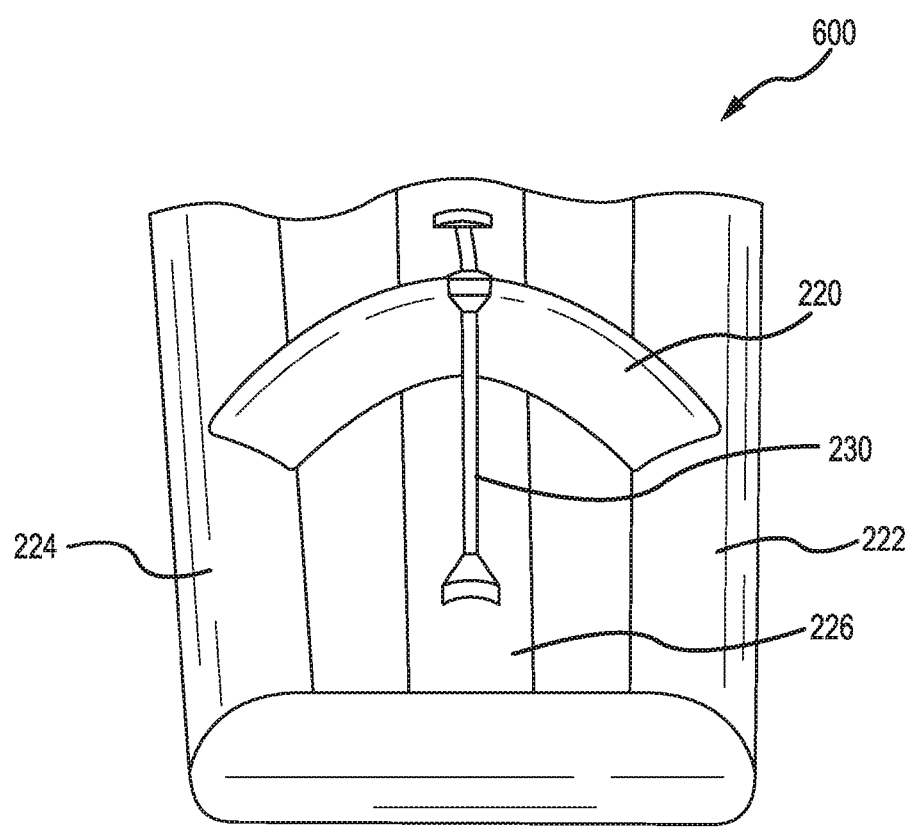
FIG. 6 illustrates a perspective view of the bottom side of an inflated evacuation slide near the toe end, in accordance with various embodiments.

With reference to FIG. 6, an evacuation slide 600 is illustrated, in accordance with various embodiments. Evacuation slide 600 may be similar to evacuation slide 100 of FIG. 1A through FIG. 4. However, evacuation slide 600 in FIG. 5 does not include arched ground support tubes as described in FIG. 1A through FIG. 4.

Figure 7:
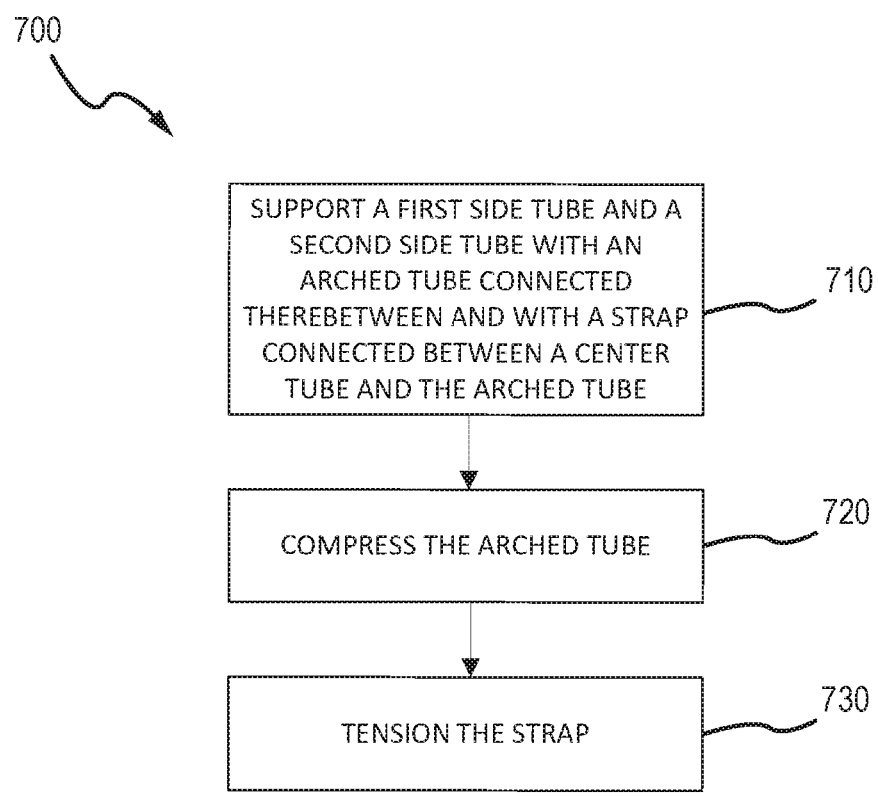
FIG. 7 illustrates a method for supporting a slide from bending under load, in accordance with various embodiments.

With reference to FIG. 7, A method 700 for supporting a slide from bending under load is provided, in accordance with various embodiments. Method 700 includes supporting a first side tube and a second side tube with an arched tube connected therebetween and with a strap connected between a center tube and the arched tube (step 710). Method 700 includes compressing the arched tube (step 720). Method 700 include tensioning the strap (step 730).

In various embodiments, with combined reference to FIG. 2 and FIG. 7, step 710 may include supporting a central portion of first side tube 222 and a central portion of second side tube 224 with arched tube 220 connected therebetween and with strap 230 connected longitudinally between location (also referred to herein as a first location) 250 along center tube 226 and the arched tube and between location (also referred to herein as a second location) 252 along the center tube 226 and the arched tube 220, the center tube 226 extending longitudinally between the first side tube 222 and the second side tube 224. Step 720 may include compressing the arched tube 220 (in the negative z-direction) in response to a bending load applied to at least one of the first side tube 222 and the second side tube 224. The bending load may be in response to a passenger sliding down the evacuation slide 100. Step 730 may include tensioning the strap 230 in response to the compression in the arched tube 220.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
   a first side tube extending longitudinally between a head end and a toe end of the evacuation slide;
   a second side tube extending longitudinally between the head end and the toe end of the evacuation slide;
   a center tube extending longitudinally between the head end and the toe end of the evacuation slide;
   an arched tube extending between the first side tube and the second side tube of the evacuation slide, the arched tube extends substantially orthogonal to the center tube, wherein the arched tube is separate from the center tube and is configured to contact the center tube in response to the evacuation slide being deployed; and
   a strap coupled between the arched tube and the center tube of the evacuation slide,
   wherein the arched tube is configured to provide vertical support to the first side tube and to the second side tube in response to a tension in the strap.

2. The evacuation slide of claim 1, wherein the evacuation slide comprises a sliding surface disposed between the first side tube and the second side tube.

3. The evacuation slide of claim 2, wherein the center tube extends substantially within a first plane and the strap extends in the first plane.

4. The evacuation slide of claim 3, wherein the evacuation slide comprises a dual lane slide, the first side tube and the center tube defining a first lane and the second side tube and the center tube defining a second lane.

5. The evacuation slide of claim 4, wherein the strap is attached to the arched tube and is attached to the center tube at a location between the arched tube and a toe end of the evacuation slide.

6. The evacuation slide of claim 4, wherein the strap is attached to the arched tube and is attached to the center tube at a location between the arched tube and a head end of the evacuation slide.

7. The evacuation slide of claim 1, wherein a first load path is formed between the arched tube and the center tube at a point of contact between the arched tube and the center tube and a second load path is formed between the arched tube and the center tube via the strap.

8. An evacuation system for an aircraft structure comprising:
   an evacuation slide coupled to the aircraft structure, the evacuation slide comprising: a first side tube;
   a center tube, the first side tube and the center tube defining a first lane;
   a second side tube, the second side tube and the center tube defining a second lane;
   an arched tube extending between the first side tube and the second side tube, the arched tube extending substantially orthogonal to the center tube wherein the arched tube is separate from the center tube and is configured to contact the center tube in response to the evacuation slide being deployed; and
   a strap coupled between the arched tube and the center tube,
   wherein the arched tube is configured to provide vertical support to the first side tube and to the second side tube in response to a tension in the strap.

9. The evacuation system of claim 8, wherein the evacuation slide comprises a sliding surface disposed between the first side tube and the second side tube.

10. The evacuation system of claim 9, wherein the first side tube, the second side tube, and the center tube are disposed substantially in parallel.

11. The evacuation system of claim 10, wherein the center tube extends substantially within a first plane and the strap extends in the first plane.

12. The evacuation system of claim 11, wherein the strap is attached to the arched tube and is attached to the center tube at a location between the arched tube and a toe end of the evacuation slide.

13. The evacuation system of claim 11, wherein the strap is attached to the arched tube and is attached to the center tube at a location between the arched tube and a head end of the evacuation slide.

14. The evacuation system of claim 8, wherein a first load path is formed between the arched tube and the center tube at a point of contact between the arched tube and the center tube and a second load path is formed between the arched tube and the center tube via the strap.

15. The evacuation system of claim 11, wherein the strap is oriented at an angle relative to the center tube.

16. A method for supporting a slide from bending under load, comprising:
- supporting a central portion of a first side tube and a central portion of a second side tube with an arched tube connected therebetween and with a strap connected longitudinally between a first location along a center tube and the arched tube and between a second location along the center tube and the arched tube, the center tube extending longitudinally between the first side tube and the second side tube,
- wherein the arched tube extends substantially orthogonal to the center tube, wherein the arched tube is separate from the center tube and is configured to contact the center tube in response to the evacuation slide being deployed.

17. The method according to claim 16, further comprising compressing the arched tube in response to a bending load applied to at least one of the first side tube and the second side tube.

18. The method according to claim 17, further comprising tensioning the strap in response to the compression in the arched tube such that a first load path is formed between the arched tube and the center tube at a point of contact between the arched tube and the center tube and a second load path is formed between the arched tube and the center tube via the strap.

* * * * *